ERROR CORRECTING AND ERROR DETECTING RECORDING APPARATUS
Filed Jan. 26, 1967
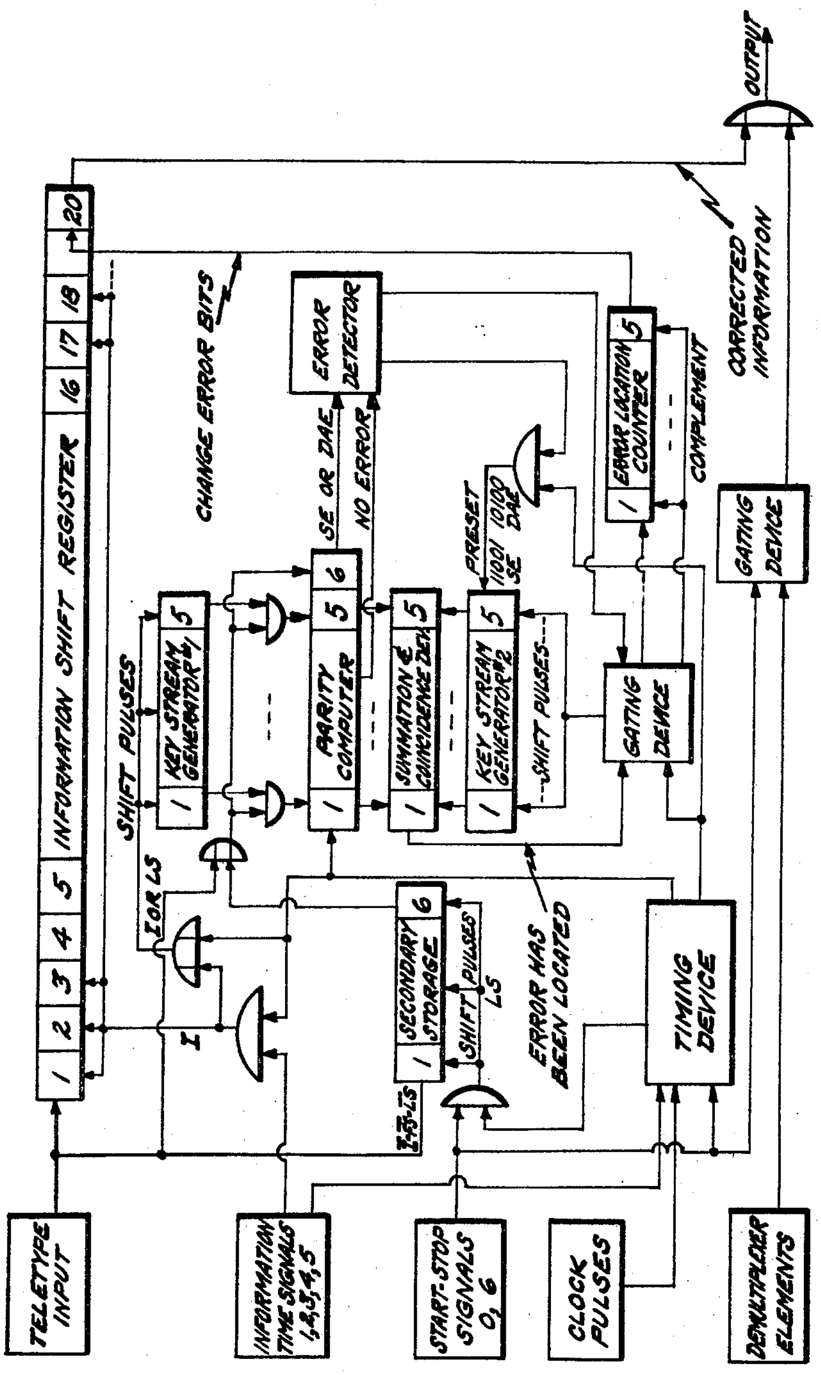
INVENTORS
RALPH M. HELLER
JAMES R. BOWEN
BY Harry A. Herbert Jr. and Herbert E. Jasher
ATTORNEYS United States Patent Office 3,479,643
Patented Nov. 18, 1969

3,479,643

ERROR CORRECTING AND ERROR DETECTING RECORDING APPARATUS

Ralph M. Heller, Baltimore, and James R. Bowen, Ellicott City, Md., assignors, by mesne assignments, to the United States of America as represented by the Secretary of the Air Force Filed Jan. 26, 1967, Ser. No. 611,971
Int. Cl. G08b *29/00;* H04l *15/34*
U.S. Cl. 340—146.1 1 Claim

ABSTRACT OF THE DISCLOSURE

Apparatus for detecting and correcting errors in encoded transmissions in radio teleprinter communication systems.

This invention relates to radio teleprinter communication systems, and more particularly, to new and improved error-correcting and error-detecting Teletype decoding apparatus.

The instant invention has utility in much of the prior art Teletype multiplex equipment such as, for example, 1, 2 or 4-channel multiplex systems of the IS–101 type in which the decoding pulses operate printing keys.

Disadvantages of prior art error-correcting and error-detecting Teletype decoding equipment include such points as:

(1) The original Teletype format is changed and then has to be reconstructed. This is not ideal for transmission of encrypted messages.

(2) Timing sometimes has to be adjusted to either speed up the bit rate to allow for the redundant bits, or to slow down the information reception rate.

(3) An encoded transmission can only be received by a receiver with a decoder.

(4) In order to continuously operate a reliable channel, spares are needed so that when an equipment failure is noticed, a spare decoder can be immediately switched in while repairs are made.

Accordingly, a primary object of this invention is to provide improved Teletype decoding apparatus which is of low cost and improved reliability.

Another object of this invention is to provide improved Teletype decoding apparatus compatible with multiplexed Teletype transmission systems.

To the accomplishment of the foregoing and additional objects, the instant invention comprehends the utilization of a multiplex Teletype system which provides a start and stop bit for every Teletype character. The decoder is incorporated into the Teletype system by breaking in between the signal detector and the demultiplexer. The Teletype input to the decoder is stored in an information shift register on information time counts, and in a secondary storage register when the incoming bit is supposed to be a parity check bit. A first key stream generator gates the incoming information bits into a parity check register. Afterward, during the last stop bit, the bits in the secondary storage register are gated into a parity computing register. The error detector then looks at the bits in the parity computing register and determines if the word has been received correctly, with one error, or with a double adjacent error. At the beginning of the first start bit of the next incoming 28 bit sequence, a second key-stream generator is preset to the proper value if an error has occurred. This second key-stream generator runs through its shifts during the first start time. The number of shifts is counted in an error location counter. When a summation and coincidence device indicates the proper value, the error location counter is complemented and continues counting at the Teletype bit rate. Meanwhile, the information in the information shift register is being shifted out by the incoming word. When the error location counter is all ones, the bit which is in error will be emerging from the information shift register. It is then changed. In the case of double adjacent errors, two bits in a row will be changed.

Other objects, aspects, uses, and advantages of the invention will become apparent from the following description and from the drawing.

In order to understand the decoding process, it is necessary to review the encoding process. The code is of the type described in the IRE "Transactions on Information Theory," December 1959. The mathematical form of the code, as well as the use of a key-stream generator to gate the parity check bits and to locate the errors is discussed by Abramson in his article in the above-cited publication in his article on adjacent error-correcting codes (to correct one random error or double adjacent errors).

The encoder is designed to go into a system as the next stage after the time multiplexer. Every 28 bit output of the multiplexer is used to form a code word regardless of the number of channels being multiplexed. Each 28 bit output of the multiplexer in uncoded operation consists of 20 information bits representing four Teletype characters and four start symbols and four stops. The actual ordering of this bit sequence is determined by the multiplex mode.

The coded system keeps only one start and one stop bit to begin and end the 28 bit sequence. The other six start and stop bits are replaced by the six parity check bits necessary to implement the code.

The way in which the proper interlacing of information bits and check bits according to the proper multiplexer mode is achieved, is to use timing signals from the multiplexer to gate both into and out of the encoding device. Similarly for the decoding system. As described by Abramson, shift registers with feedback are used to simply implement the code.

It can be seen that there is no difference between the coded and non-coded transmission as to the location of each bit of each Teletype character. This is the compatibility feature which makes the coding system adaptable to many types of equipment without much complexity.

At the encoder the six parity check bits are formed from the 20 message bits as follows:

$$P_1=x_1+x_5+x_7+x_9+x_{10}+x_{11}+x_{12}+x_{14}+x_{15}+x_{17}+x_{20}$$
$$P_2=x_2+x_6+x_8+x_{10}+x_{11}+x_{12}+x_{13}+x_{15}+x_{16}+x_{18}+P_1$$
$$P_3=x_3+x_7+x_9+x_{11}+x_{12}+x_{13}+x_{14}+x_{16}+x_{17}+x_{19}+P_2$$
$$P_4=x_1+x_4+x_8+x_{10}+x_{12}+x_{13}+x_{14}+x_{15}+x_{17}+x_{18}+x_{20}+P_3$$
$$P_5=x_1+x_2+x_5+x_9+x_{11}+x_{13}+x_{14}+x_{15}+x_{16}+x_{18}+x_{19}+P_1+P_4$$
$$P_6=x_1+x_2+x_3+x_4+x_5+x_6+x_7+x_8+x_9+x_{10}+x_{11}+x_{12}+x_{13}+x_{14}+x_{15}+x_{16}+x_{17}+x_{18}+x_{19}+x_{20}+P_1+P_2+P_3+P_4+P_5$$

where $x_i$ is the $i$th bit of information.

At the decoder, the incoming stream of interlaced information and parity check bits are gated by another key-stream generator to again form a set of 6 parity check bits. This will test the correctness of the incoming word. The 6 parity check bits at the decoder are formed according to the following equations.

$$P_1''=y_1+y_5+y_7+y_9+y_{10}+y_{11}+y_{12}+y_{14}+y_{15}+y_{17}+y_{20}+P_1'$$
$$P_2''=y_2+y_6+y_8+y_{10}+y_{11}+y_{12}+y_{13}+y_{15}+y_{16}+y_{18}+P_1'+P_2'$$
$$P_3''=y_3+y_7+y_9+y_{11}+y_{12}+y_{13}+y_{14}+y_{16}+y_{17}+y_{19}+P_2'+P_3'$$
$$P_4''=y_1+y_4+y_8+y_{10}+y_{12}+y_{13}+y_{14}+y_{15}+y_{17}+y_{18}+y_{20}+P_3'+P_4'$$
$$P_5''=y_1+y_2+y_5+y_9+y_{11}+y_{13}+y_{14}+y_{15}+y_{16}+y_{18}+y_{19}+P_1'+P_4'+P_5'$$
$$P_6''=y_1+y_2+y_3+y_4+y_5+y_6+y_7+y_8+y_9+y_{10}+y_{11}+y_{12}+y_{13}+y_{14}+y_{15}+y_{16}+y_{17}+y_{18}+y_{19}+y_{20}+P_1'+P_2'+P_3'+P_4'+P_5'+P_6'$$

where $y_i$ represents the *i*th information digit as received, $P_i'$ represents the *i*th parity check digit as received, and $P_i''$ represents the *i*th parity check bit formed at the decoder from the received bit sequence.

It can be clearly seen that if no error has occurred in the transmission, all of the $P_i''$ will be zero. If, however, an error has occurred, there are two possibilities as either $P_6''$ is a zero or a one. In the first case it will be assumed that a double adjacent error has occurred. In the second case, a single error will be indicated, as $P_6''$ is a parity check over all of the received digits. The error is located by means of the second key-stream generator. This is preset to one of two values 10100 or 11000 according to whether a double adjacent or single error occurred. This key-stream generator is then shifted until the modulo 2 sum of its contents and the bits $P_1''$, $P_2''$, $P_3''$, $P_4''$, $P_5''$ are either 00000 or 11111 according to whether a double adjacent error or a single error occurred.

An example will demonstrate this procedure quite readily. Suppose that an error occurs in the 5th received information digit. From the previous equations, we will get $P_1''=1$
$P_2''=0$
$P_3''=0$
$P_4''=0$
$P_5''=1$
$P_6''=1$ Since all the $P_i''$ are not zero and $P_6''$ is one, a single error is indicated. The 2nd key-stream generator (which has feedback from the sum of the third and fifth stages) will be started at 11000. The states of the register after a number of shifts will be as follows:

Start—11000
After 1st shift—01100
After 2nd shift—10110
After 3rd shift—11011
After 4th shift—11101
After 5th shift—01110

The sum of the contents of the key stream generator after 5 shifts and $P_1'' \ldots P_5''$ is $$\begin{array}{r} 01110 \\ +10001 \\ \hline 11111 \end{array}$$

Thus the error is indicated to be in the 5th information bit.

As can be seen from the drawing, the decoding system can be thought of as three interrelated subsystems. The information shift register, the secondary storage register, the first key-stream generator, and the parity computing register form the parity checking subsystem. The summation and coincidence device, the second key-stream generator, the error detector and error location counter form the error detection, location and correction subsystem. The othe subsystem consists of various timing, gating and counting devices, all of which regulate the times of operation of various components of the parity checking and error correcting subsystems. The operation of the decoding equipment is then based upon these signals. For brevity the outputs of the timing subsystem are abbreviated on the diagram as follows:

FS=first start time
$\overline{\text{FS}}$=not first start time
LS=last stop time
$\overline{\text{LS}}$=not last stop time
I=information time
$\overline{\text{I}}$=not information time The diagram shows that the Teletype input to the decoder is stored in an information shift register on information time counts, and in a secondary storage register when the incoming bit is supposed to be a parity check bit. As in the encoder, the first key-stream generator gates the incoming information bits into the parity check register. Afterward, during the last stop bit, the bits in the secondary storage register are gated into the parity computing register. The error detector then looks at the bits in the parity computing register and determines if the word has been received correctly, with one error (SE), or with a double adjacent error (DAE). At the beginning of the first start bit of the next incoming 28 bit sequence, the second key-stream generator is preset to the proper value if an error has occurred. This second key-stream generator runs through its shifts during the first start time. The number of shifts is counted in the error location counter. When the summation and coincidence device indicates the proper value, the error location counter is complemented and continues counting at the Teletype bit rate. Meanwhile, the information in the information shift register is being shifted out by the incoming word. When the error location counter is all ones, the bit which is in error will be emerging from the information shift register. It is then changed. In the case of double adjacent errors, two bits in a row will be changed.

From the foregoing description it will be seen that the main advantage of a decoder of this type is that a simple decoding system can be incorporated into a Teletype system by breaking in between the signal detector and the demultiplexer. The redundancy is already there in the system and can be cheaply and usefully used. The Teletype system itself can be geared to time the decoder regardless of the permutation of the bit sequence for a particular multiplex mode. Since the parity check bits are placed where some start and stop bits were originally, there is no change in information or actual transmission rates. Other aspects of the code to consider are:

(1) The code offers an improvement in message reliability of an order of magnitude or more for error rates of .01 or better.

(2) No spares are needed for continuous reliable transmission. When the decoder fails, the receiver can operate as a normal Teletype receiver until the decoder is repaired.

(3) Its implementation does not require any complex or costly modifications and additions to the original system.

(4) The five-bit Teletype characters actually appear in the same form and bit locations as the uncoded transmission. This permits the simultaneous operation of encoded Teletype into ordinary Teletype receivers with or without the decoding apparatus.

(5) The *A/J* protection against pulse jamming afforded by the code's double adjacent error correcting properties.

(6) The use of the code's error-*detecting* capabilities to operate a channel sensing device in an adaptable communication system which could automatically change multiplex modes so as to combat channel conditions.

(7) The extra error protection and channel sensing which could be gained by simultaneously operating the encoded transmission into a decoder and a normal Teletype printer; and then comparing the two received messages bit by bit.

Therefore, while a single embodiment of the invention has been illustrated and described, it is to be understood that the invention is not limited thereto but contemplates such modifications and further embodiments as may occur to those skilled in the art.

We claim:

1. In combination with a multiplex Teletype system which provides a start and stop bit for every Teletype character message including parity check bits and information bits transmitted, decoding apparatus comprising information shift register means responsive to said start bit for storing information time counts from a Teletype input, secondary storage register means connected between said Teletype input and said information shift register means for storing parity check bits, parity check register means, first key-stream generator means for gating said stored information time counts into said parity check register means, a means responsive to said stop bit for gating said parity check bits into said parity check register means, error detector means connected to the output of said parity check register means, second key-stream generator means responsive to the output of said error detector means, means for pre-setting said second generator means at the beginning of the next successive start bit when an error has been detected by said error detector means, error location counter means responsive to the output of said error detector means, summation and coincidence means connected to the output of said parity check register means and to the output of said second key-stream generator means, and means including a gating device connected to the output of said summation and coincidence means and to the input of said error location counter means for correcting any bit which is in error in said information storage register by providing an error correction signal from the output of said error location counter means to said information storage register.

References Cited

UNITED STATES PATENTS

| | | | |
|---|---|---|---|
| 2,956,124 | 10/1960 | Hagelbarger | 340—146.1 X |
| 3,162,837 | 12/1964 | Meggitt | 340—146.1 |
| 3,163,848 | 12/1964 | Abramson | 340—146.1 |
| 3,373,404 | 3/1968 | Webb | 340—146.1 |
| 3,402,390 | 9/1968 | Tsimbidis et al. | 340—146.1 |

MALCOLM A. MORRISON, Primary Examiner

CHARLES E. ATKINSON, Assistant Examiner

U.S. Cl. X.R.

178—23